United States Patent
Shigehisa

(10) Patent No.: US 10,778,933 B2
(45) Date of Patent: Sep. 15, 2020

(54) ENDOSCOPE APPARATUS

(71) Applicant: OLYMPUS CORPORATION, Tokyo (JP)

(72) Inventor: Yoshiyuki Shigehisa, Fuchu (JP)

(73) Assignee: OLYMPUS CORPORATION, Tokyo (JP)

( * ) Notice: Subject to any disclaimer, the term of this patent is extended or adjusted under 35 U.S.C. 154(b) by 328 days.

(21) Appl. No.: 15/859,855

(22) Filed: Jan. 2, 2018

(65) Prior Publication Data

US 2018/0199003 A1 Jul. 12, 2018

(30) Foreign Application Priority Data

Jan. 12, 2017 (JP) .................................. 2017-003323

(51) Int. Cl.
| | | |
|---|---|---|
| *H04N 5/63* | (2006.01) | |
| *G02B 23/24* | (2006.01) | |
| *H04N 5/374* | (2011.01) | |
| *H04N 5/225* | (2006.01) | |
| *H04N 5/232* | (2006.01) | |

(52) U.S. Cl.
CPC ........... *H04N 5/63* (2013.01); *G02B 23/2492* (2013.01); *H04N 5/374* (2013.01); *H04N 5/23241* (2013.01); *H04N 2005/2255* (2013.01)

(58) Field of Classification Search
None
See application file for complete search history.

(56) References Cited

U.S. PATENT DOCUMENTS

| | | | | |
|---|---|---|---|---|
| 2008/0018734 | A1* | 1/2008 | Iriyama | A61B 1/0005 348/72 |
| 2013/0265403 | A1* | 10/2013 | Okawa | A61B 1/045 348/76 |
| 2014/0307071 | A1* | 10/2014 | Hirosawa | A61B 1/00133 348/65 |
| 2015/0138328 | A1* | 5/2015 | Yokohama | A61B 1/00018 348/65 |
| 2015/0280550 | A1* | 10/2015 | Minakuchi | G02B 23/2484 348/65 |

FOREIGN PATENT DOCUMENTS

JP 2011-206333 A 10/2011

* cited by examiner

*Primary Examiner* — William C Vaughn, Jr.
*Assistant Examiner* — Jerry T Jean Baptiste
(74) *Attorney, Agent, or Firm* — Scully, Scott, Murphy & Presser, P.C.

(57) ABSTRACT

An endoscope apparatus includes a power supply section configured to supply first power and second power to a load apparatus provided at a distal end portion of an insertion portion from an apparatus body, and a power supply control section configured to control the power supply section by instructing the power supply section to determine a first command signal based on a target voltage and a feedback voltage which is a voltage of the first power fed back from the distal end portion to the apparatus body so as to output the first power in accordance with the first command signal, and instructing the power supply section P to determine a second command signal based on the first command signal so as to output the second power in accordance with the second command signal.

19 Claims, 6 Drawing Sheets

ENDOSCOPE APPARATUS

CROSS-REFERENCE TO RELATED APPLICATION

This application is based upon and claims the benefit of priority from the Japanese Patent Application No. 2017-3323 filed in Japan on Jan. 12, 2017, the entire contents of which are incorporated herein by reference.

BACKGROUND OF THE INVENTION

1. Field of the Invention

The present invention relates to an endoscope apparatus.

2. Description of the Related Art

Conventionally, endoscope apparatuses configured to pick up images of an interior of an object using an insertion portion have been known.

The insertion portion of the endoscope apparatus, in particular the insertion portion of an endoscope apparatus for industrial use, is formed into an elongated shape so as to be able to observe long objects such as an interior of a pipe in production facilities or small objects such as an interior of a small hole of a structure. The insertion portion of the endoscope apparatus for industrial use is configured to be able to operate over a wide temperature range so that it may be inserted into an object exposed to a high temperature such as an engine.

A CMOS sensor for acquiring an object image may be provided at a distal end portion of the insertion portion of the endoscope apparatus. A power supply for driving the CMOS sensor is supplied from an apparatus body via a power supply line inserted into the insertion portion. The endoscope apparatus may be provided with a power supply circuit in the distal end portion of the insertion portion so as to be able to supply a stable voltage to the distal end portion via the insertion portion which is formed into an elongated shape even when an ambient temperature varies.

For example, Japanese Patent Application Laid-Open Publication No. 2011-206333 discloses an endoscope apparatus in which a regulator is disposed in the vicinity of a CMOS sensor at a distal end portion of an insertion portion.

SUMMARY OF THE INVENTION

An endoscope apparatus according to an aspect of the present invention includes a power supply section configured to supply first power and second power to a load apparatus provided at a distal end portion of an insertion portion from an apparatus body, and a power supply control section configured to control the power supply section by instructing the power supply section to determine a first command signal based on a target voltage and a feedback voltage which is a voltage of the first power fed back from the distal end portion to the apparatus body so as to output the first power in accordance with the first command signal, and instructing the power supply section to determine a second command signal based on the first command signal so as to output the second power in accordance with the second command signal.

DETAILED DESCRIPTION OF THE PREFERRED EMBODIMENT

Hereinafter, an embodiment of the present invention will be described with reference to the accompanying drawings.
(Configuration)

Figure 1:
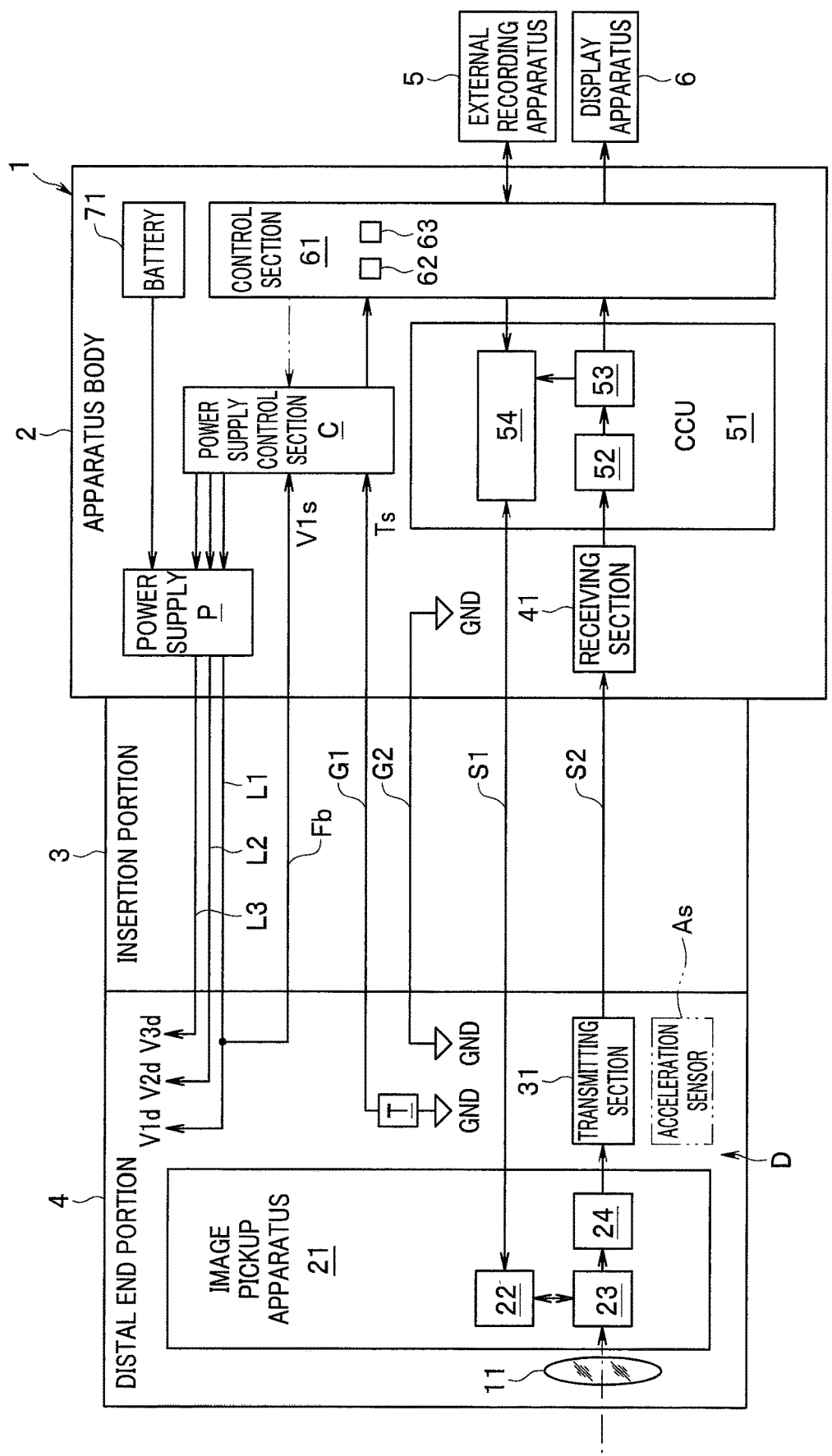
FIG. 1 is a block diagram illustrating an example of a configuration of an endoscope apparatus according to an embodiment of the present invention.

FIG. 1 is a block diagram illustrating an example of a configuration of an endoscope apparatus 1 according to an embodiment of the present invention.

The endoscope apparatus 1 includes an apparatus body 2 and an insertion portion 3 connected to the apparatus body 2. The insertion portion 3 can pick up an image of an object through a distal end portion 4. The apparatus body 2 is provided with an external recording apparatus 5 and a display apparatus 6 so as to be able to record and display picked-up images.

The distal end portion 4 is provided with an optical system 11, an image pickup apparatus 21, a transmitting section 31 and a thermistor T. The image pickup apparatus 21, the transmitting section 31 and the thermistor T constitute a load apparatus D. The load apparatus D is supplied with three systems of power supply from the apparatus body 2. The thermistor T is a temperature detection device, a resistance value of which varies depending on a variation in an ambient temperature.

The optical system 11 includes a condensing lens, takes in an object image from outside and projects the object image onto the image pickup apparatus 21.

The image pickup apparatus 21 includes an operating mode setting section 22, a light receiving section 23 and a differential signal output section 24.

The operating mode setting section 22 is connected to a CCU (Camera Control Unit) 51 via a signal line S1 inserted into the insertion portion 3. The operating mode setting section 22 is connected to the light receiving section 23 and configured to set operating modes such as an AGC gain, a frame rate and a shutter speed at the light receiving section 23 under the control of the CCU 51.

The light receiving section 23 is connected to the differential signal output section 24. The light receiving section 23 includes a photoelectric conversion element and is configured to convert the object image projected by the optical system 11 to an image pickup signal and output the image pickup signal to the differential signal output section 24.

The differential signal output section 24 is connected to the transmitting section 31. The differential signal output section 24 is configured to serialize the image pickup signal inputted from the light receiving section 23, convert the image pickup signal to a differential signal and output the differential signal to the transmitting section 31.

The transmitting section 31 is connected to a receiving section 41 via a signal line S2 inserted into the insertion portion 3. The signal line S2 is formed of an optical fiber. The transmitting section 31 is configured to transmit a single ended signal which is an optical signal to the receiving section 41 using a vertical cavity surface-emitting laser (VCSEL) via the signal line S2.

The thermistor T is configured to output a thermistor signal Ts to the apparatus body 2, with one end of the thermistor T being connected to a grounding voltage GND of the distal end portion 4 and the other end being connected to the apparatus body 2 via the grounding wire G1 inserted into the insertion portion 3. The thermistor T is configured to output a grounding voltage GNDs in the distal end portion 4 or a temperature detection signal St to a power supply control section C under the control of the power supply control section C. Operation of the power supply control section C will be described later.

The grounding voltage GND of the distal end portion 4 is connected to a grounding voltage GND of the apparatus body 2 via a grounding wire G2.

The apparatus body 2 includes the receiving section 41, the CCU 51, a control section 61, a battery 71, the power supply control section C and a power supply section P.

The receiving section 41 is connected to the CCU 51. The receiving section 41 includes a photodiode and transimpedance amplifier, and is configured to convert an optical signal received from the transmitting section 31 to a differential signal which is an electric signal, amplify the differential signal and output the differential signal to the CCU 51.

The CCU 51 is connected to the control section 61. The CCU 51 is configured to control the image pickup apparatus 21 and apply image processing on picked-up images outputted from the image pickup apparatus 21. The CCU 51 includes a differential signal input section 52, an image processing section 53 and an operating mode control section 54. Note that the CCU 51 may be constructed of an FPGA.

The differential signal input section 52 is connected to the image processing section 53. The differential signal input section 52 is configured to parallelize the differential signal inputted from the receiving section 41, generate a picked-up image and output the picked-up image to the image processing section 53.

The image processing section 53 is connected to the operating mode control section 54 and the control section 61. The image processing section 53 applies image processing such as noise reduction, dynamic range expansion or contour emphasis to the picked-up image inputted from the differential signal input section 52, and outputs the processed image to the operating mode control section 54 and the control section 61. Note that the image processing performed by the image processing section 53 is not limited to noise reduction, dynamic range expansion or contour emphasis.

The operating mode control section 54 is connected to the operating mode setting section 22. The operating mode control section 54 controls an operating mode of the image pickup apparatus 21. For example, the operating mode control section 54 determines an AGC gain based on the picked-up image inputted from the image processing section 53, outputs the AGC gain to the operating mode setting section 22 and controls the operating mode of the image pickup apparatus 21. The operating mode control section 54 also outputs set values of the frame rate and the shutter speed to the operating mode setting section 22 and controls the operating mode of the image pickup apparatus 21. Note that the operating mode control section 54 may also control other operating modes, and is not limited to the operating modes of the AGC gain, the frame rate and the shutter speed.

The control section 61 is configured to be able to control operation of each part of the endoscope apparatus 1. The control section 61 includes a CPU (central processing unit) 62 and a storage section 63. Functions of the CPU 62 are implemented by reading and executing a program stored in the storage section 63.

The control section 61 can store the picked-up image inputted from the image processing section 53 in the storage section 63, output the picked-up image to the external recording apparatus 5 and output the picked-up image to the display apparatus 6. The control section 61 can read various types of information from the external recording apparatus 5. The control section 61 can output an instruction to the operating mode control section 54 and control operation of the operating mode control section 54. The control section 61 can detect temperature information of the distal end portion 4 from the temperature detection signal St inputted via the power supply control section C.

The battery 71 is connected to the power supply section P and configured to be able to supply power to the power supply section P.

Figure 2:
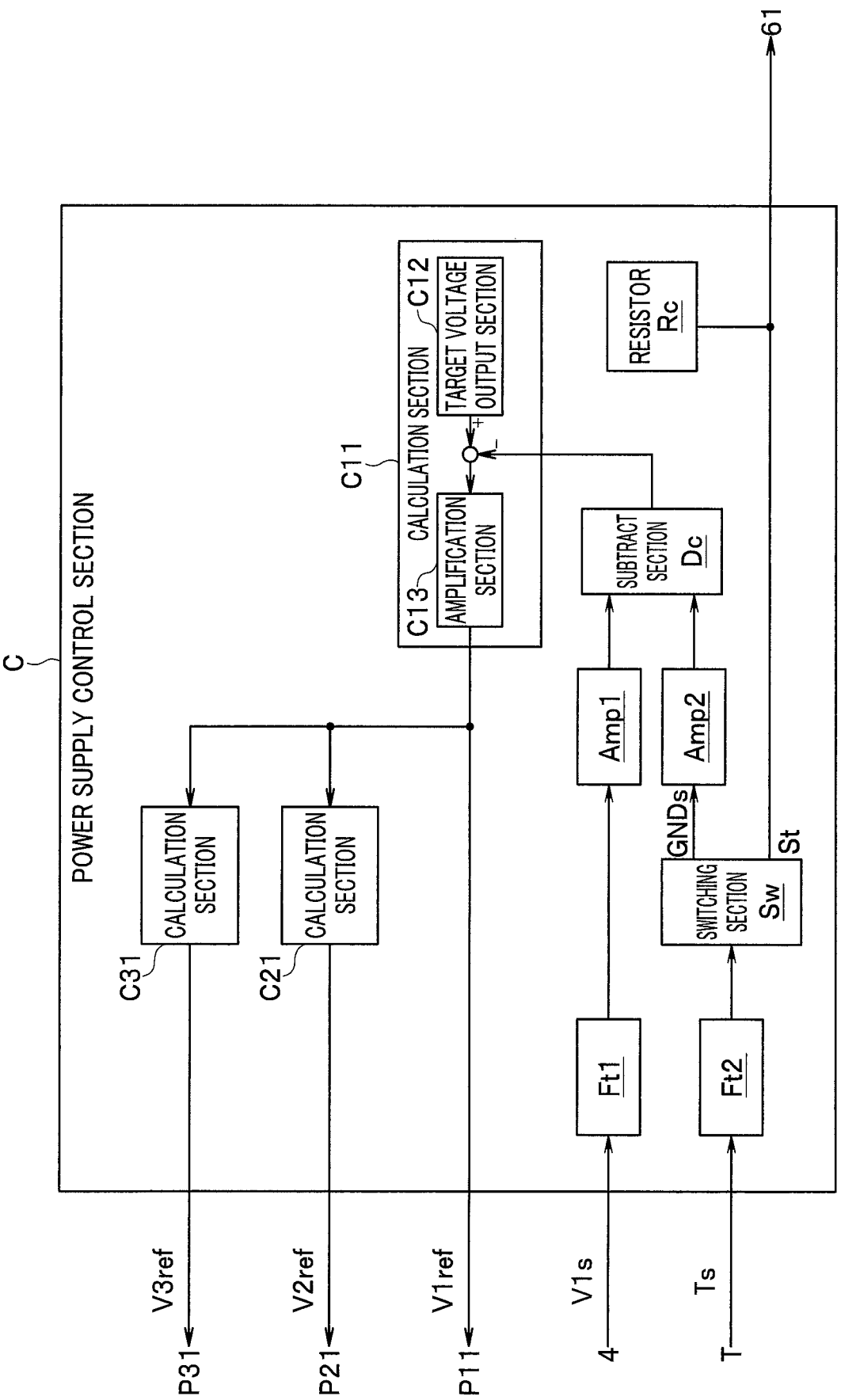
FIG. 2 is a block diagram illustrating an example of a configuration of a power supply control section of the endoscope apparatus according to the embodiment of the present invention.
Figure 3:
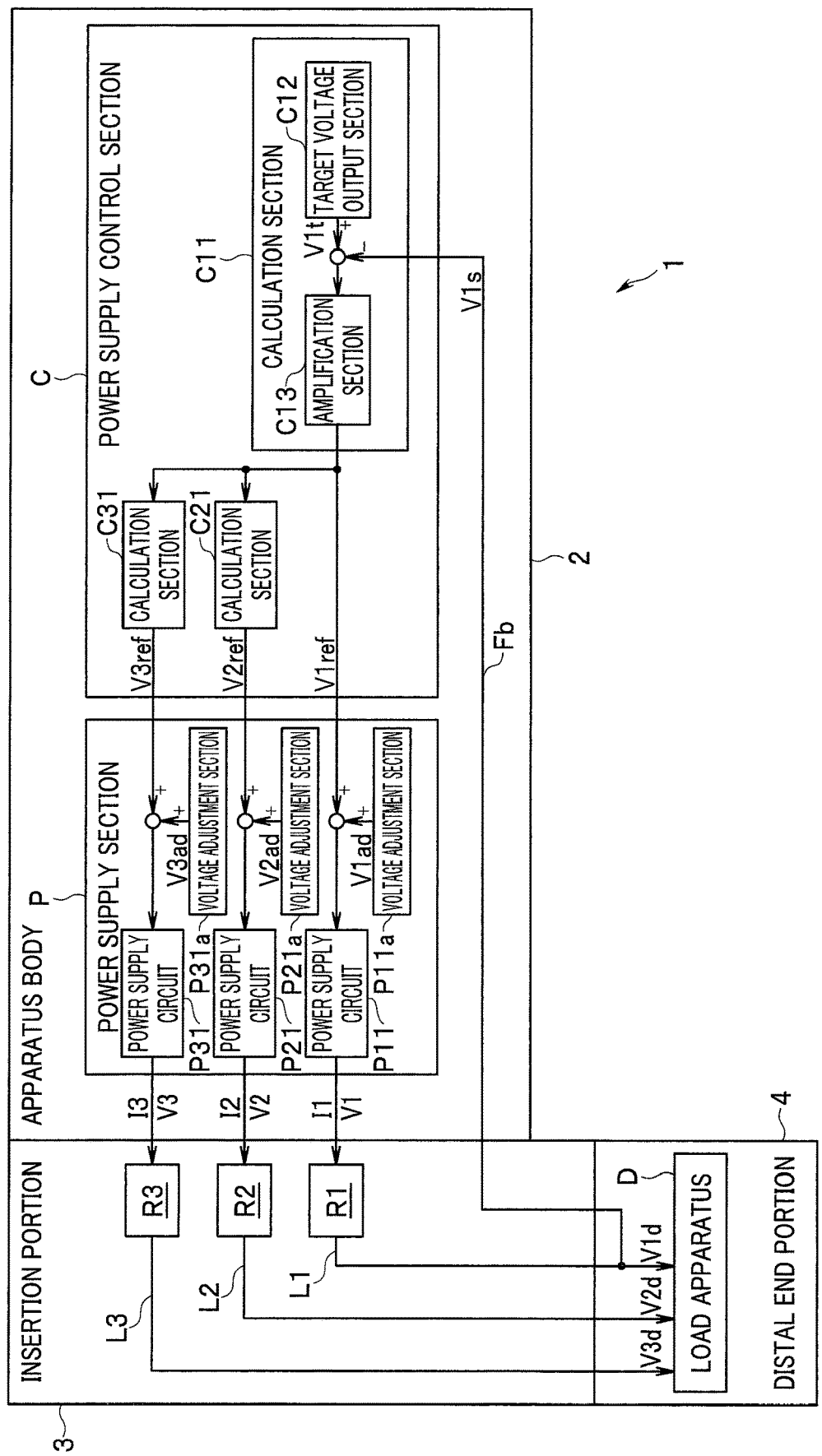
FIG. 3 is a block diagram illustrating an example of a configuration of the endoscope apparatus according to the embodiment of the present invention.

FIG. 2 is a block diagram illustrating an example of a configuration of the power supply control section C of the endoscope apparatus 1 according to the embodiment of the present invention. FIG. 3 is a block diagram illustrating an example of a configuration of the endoscope apparatus 1 according to the embodiment of the present invention.

The power supply control section C is configured to control the power supply section P by determining signals for indicating voltage values of drive voltages V1, V2 and V3 (hereinafter referred to as "command signals") V1ref, V2ref and V3ref to the power supply section P based on a feedback voltage V1$s$ fed back from the distal end portion 4 and a grounding voltage GNDs and outputting the command signals V1ref, V2ref and V3ref. As shown in FIG. 2, the power supply control section C includes filters Ft1 and Ft2, a switching section Sw, amplification sections Amp1 and Amp2, a resistor Rc, a subtraction section Dc, and calculation sections C11, C21 and C31.

The filter Ft1 is a low-pass filter configured to remove high frequency noise from an inputted feedback voltage V1$s$ and output the noise-free feedback voltage V1$s$ to the amplification section Amp1.

The amplification section Amp1 is configured to impedance-convert the feedback voltage V1$s$ inputted from the filter Ft1 and output the feedback voltage V1$s$ to the subtraction section Dc. The amplification section Amp1 has high input impedance so as to be able to reduce the amount of current and prevent a voltage drop of a feedback line Fb.

The filter Ft2 is a low-pass filter configured to remove high frequency noise from the inputted thermistor signal Ts and output the noise-free thermistor signal Ts to the switching section Sw.

The switching section Sw is connected to the amplification section Amp2 and the control section 61. The switching section Sw alternately selects one of the amplification section Amp2 and the control section 61 as the output destination of the thermistor signal Ts inputted from the filter Ft2 according to a time division system for every predetermined time period. The thermistor signal Ts is outputted to the amplification section Amp2 as the grounding voltage GNDs and outputted to the control section 61 as the temperature detection signal St.

The amplification section Amp2 is configured to impedance-convert the grounding voltage GNDs inputted from the switching section Sw and output the grounding voltage GNDs to the subtraction section Dc. The amplification section Amp2 has high input impedance so as to be able to prevent a voltage drop of the grounding wire G1.

The resistor Rc is configured to pull up the temperature detection signal St outputted from the switching section Sw to the control section 61 to a predetermined fixed voltage. When the temperature of the distal end portion 4 varies and the resistance value of the thermistor T varies, a detection voltage determined by the resistor Rc and the voltage divided by the resistor is inputted to the control section 61. The control section 61 detects the temperature variation.

The subtraction section Dc subtracts the grounding voltage GNDs from the feedback voltage V1s so that the feedback line Fb and the voltage drop of the grounding wire G1 cancel out each other and outputs the subtraction result to the calculation section C11.

The calculation section C11 is configured to determine the command signal V1ref based on the feedback voltage V1s and output the command signal V1ref to the power supply circuit P11. The calculation section C11 includes a target voltage output section C12 and an amplification section C13.

The target voltage output section C12 is configured to output a target voltage V1t to the amplification section C13. The target voltage V1t is a voltage which becomes a target for the power supply supplied to the load apparatus D through the power supply line L1 and is preset in accordance with characteristics of the load apparatus D.

Note that target voltages V2t and V3t which will be described later are also preset in accordance with characteristics of the load apparatus D.

The amplification section C13 is configured to amplify the difference between the inputted feedback voltage V1s and the target voltage V1t by a predetermined gain G and output the command signal V1ref to the power supply circuit P11 and the calculation sections C21 and C31. As will be described later, the predetermined gain G is set so as to be sufficiently larger than the voltage drop of an adjustment signal V1ad and a power supply line L1.

That is, the power supply control section C is configured to determine the command signal V1ref based on the target voltage V1t and the result of subtracting the grounding voltage GNDs from the feedback voltage V1s.

Furthermore, the calculation section C11 causes the target voltage output section C12 to output the target voltage V1t. The calculation section C11 causes the amplification section 13 to amplify the result obtained by subtracting the feedback voltage V1s from the target voltage V1t by a predetermined amplification factor, to determine the command signal V1ref on the basis of the amplification result by the amplification section C13.

The calculation section C21 is configured to calculate a predetermined function f1 based on the inputted command signal V1ref and output the command signal V2ref to a power supply circuit P21. The predetermined function f1 is defined as a function of the command signal V1ref. The predetermined function f1 is preset so that a distal end portion voltage V2d becomes a target voltage V2t.

That is, the calculation section C21 is configured to make a predetermined calculation of the command signal V1ref and determine the command signal V2ref.

The calculation section C31 is configured to make a calculation of a predetermined function f2 based on the inputted command signal V2ref and output a command signal V3ref to a power supply circuit P31. The predetermined function f2 is defined as a function of the command signal V1ref. The predetermined function f2 is preset so that a distal end portion voltage V3d becomes a target voltage V3t.

Note that the respective predetermined functions f1 and f2 may be set according to experimentally obtained characteristic values or may be set according to provisionally estimated characteristic values in a designing manner.

The power supply section P is a circuit configured to supply power to the load apparatus D. The power supply section P is configured to supply power to the load apparatus D based on the power inputted from the battery 71 and the command signals V1ref, V2ref and V3ref inputted from the power supply control section C. The power supply section P includes the power supply circuits P11, P21 and P31 and voltage adjustment sections P11a, P21a and P31a.

The power supply circuit P11 is connected to the power supply line L1. The power supply circuit P11 is configured to generate a drive voltage V1 and a drive current I1 to drive the load apparatus D based on the command signal V1ref inputted from the calculation section C11 and output the drive voltage V1 and the drive current I1 to the power supply line L1. The power supply circuit P21 is configured to output a drive voltage V2 and a drive current I2 to the power supply line L2 based on the command signal V2ref inputted from the calculation section C21. Furthermore, the power supply circuit P31 is configured to output a drive voltage V3 and a drive current I3 to a power supply line L3 based on the command signal V3ref inputted from the calculation section C31.

The voltage adjustment sections P11a, P21a and P31a are configured to adjust the respective voltages of the command signals V1ref, V2ref and V3ref. The voltage adjustment section P11a is configured to add the adjustment signal V1ad to the command signal V1ref. The voltage adjustment section P21a is configured to add the adjustment signal V2ad to the command signal V2ref. The voltage adjustment section P31a is configured to add the adjustment signal V3ad to the command signal V3ref.

The adjustment signal V1ad is adjusted and preset prior to factory shipment or the like in a normal temperature environment of 25° C. so that the distal end portion voltage V1d matches the target voltage V1t, that is, V1ref=0. Note that the adjustment signal V1ad may be a pre-calculated design value. The adjustment signal V2ad is adjusted so that the distal end portion voltage V2d matches the target voltage V2t in the power supply line L2 in a state of V2ref=0. Furthermore, the adjustment signal V3ad is also adjusted so that the distal end portion voltage V3d matches the target voltage V3t in the power supply line L3 in a state of V3ref=0.

The power supply lines L1, L2 and L3 are respectively inserted into the insertion portion 3 and connected to the load apparatus D. The power supply line L1 includes a resistor R1, the power supply line L2 includes a resistor R2 and the power supply line L3 includes a resistor R3. Note that the resistors R1, R2 and R3 vary depending on the ambient temperature.

The feedback line Fb is inserted into the insertion portion 3, one end of which is connected to the power supply line L1 in the distal end portion 4 and the other end of which is connected to the power supply control section C.

That is, the load apparatus D is supplied with first system power via the power supply line L1, second system power via the power supply line L2 and third system power via the power supply line L3.

Furthermore, the endoscope apparatus 1 includes the power supply section P configured to supply first power and second power from the apparatus body 2 to the load apparatus D provided at the distal end portion 4 of the insertion portion 3 and the power supply control section C configured to control the power supply section P by instructing the power supply section P so as to determine the first command signal V1ref based on the target voltage V1$t$ and the feedback voltage V1$s$ which is the first power supply voltage fed back to the apparatus body 2 from the distal end portion 4 and output the first power supply in accordance with the first command signal V1ref, and instructing the power supply section P so as to determine the second command signal V2ref based on the first command signal V1ref and output the second power supply in accordance with the second command signal V2ref.

The endoscope apparatus 1 includes the first power supply line L1, the second power supply line L2 and the feedback line Fb, and the first power supply line L1 supplies first power from the power supply section P to the load apparatus D, the second power supply line L2 supplies second power from the power supply section P to the load apparatus D and the feedback line Fb is connected to the first power supply line L1 in the distal end portion 4 to cause the feedback voltage V1$s$ to be fed back.

(Operation)

Operation of the endoscope apparatus 1 according to the embodiment will be described.

Figure 4:
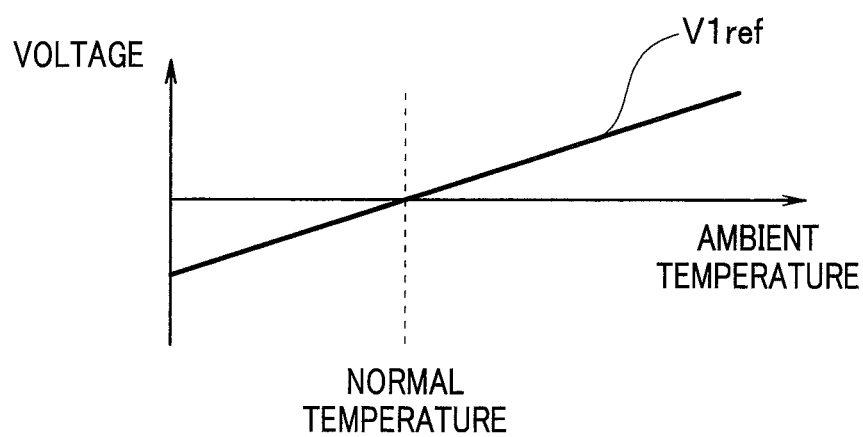
FIG. 4 is a graph illustrating a relationship between a command signal V1ref and a temperature of the endoscope apparatus according to the embodiment of the present invention.
Figure 5:
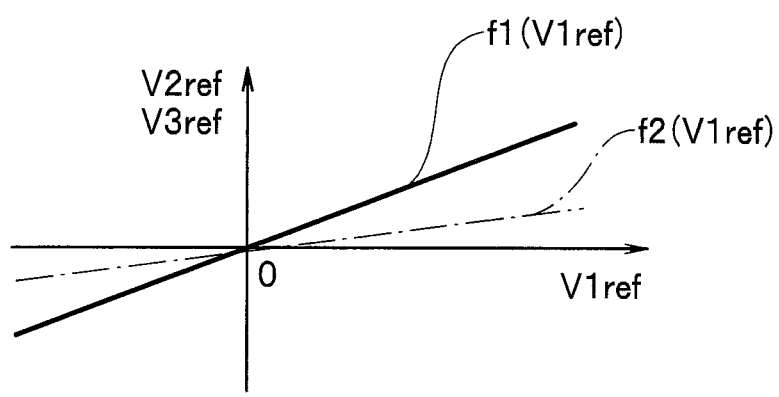
FIG. 5 is a graph illustrating a relationship between a command signal V1ref, a command signal V2ref and a command signal V3ref of the endoscope apparatus according to the embodiment of the present invention.

FIG. 4 is a graph illustrating a relationship between the command signal V1ref and temperature of the endoscope apparatus 1 according to the embodiment of the present invention. FIG. 5 is a graph illustrating a relationship between the command signal V1ref, the command signal V2ref and the command signal V3ref in the endoscope apparatus 1 according to the embodiment of the present invention.

Operation of the circuit that supplies first system power will be described first.

In the calculation section C11, the target voltage output section C12 outputs the target voltage V1$t$ to the amplification section C13.

A difference between the target voltage V1$t$ and the feedback voltage V1$s$ is inputted to the amplification section C13. The amplification section C13 amplifies the inputted voltage by a predetermined gain G and outputs the command signal V1ref indicated by G×(V1$t$−V1$s$) to the power supply circuit P11. Since V1$s$=V1$d$, the command signal V1ref is also indicated by G×(V1$t$−V1$d$). Note that description of the grounding voltage GNDs which is subtracted from the feedback voltage V1$s$ will be omitted.

The command signal V1ref to which the adjustment signal V1$ad$ is added by the voltage adjustment section P11$a$ is inputted to the power supply circuit P11. The power supply circuit P11 generates the drive voltage V1 and the drive current I1 in accordance with the command signal V1ref and outputs them to the power supply line L1. Note that a case will be described in the embodiment where the gain of the power supply circuit P11 is 1 time, but the gain of the power supply circuit P11 is not limited to this.

A voltage drop expressed by resistance R1×drive current I1 occurs in the power supply line L1. Therefore, the distal end portion voltage V1$d$ is expressed by equation (1).

$$V1d = V1ref + V1ad - I1 \times R1 \quad (1)$$

Equation (2) is derived based on equation (1).

$$V1ref = G \times (V1t - V1d)$$

$$V1d = G \times (V1t - V1d) + V1ad - I1 \times R1$$

$$V1d = (G \times V1t + V1ad - I1 \times R1)/(1+G) \quad (2)$$

In equation (2), the predetermined gain G is preset so as to become sufficiently larger than the adjustment signal V1$ad$ and a voltage drop expressed by I1×R1. Therefore, the distal end portion voltage V1$d$ approximates to the target voltage V1$t$.

In a normal temperature environment at 25° C. or the like, the adjustment signal V1$ad$ is adjusted so that the distal end portion voltage V1$d$ matches the target voltage V1$t$. After the adjustment, V1ref=G×(V1$t$−V1$d$)=0. When an average current I1$av$ which is an average current flows through the power supply line L1 having a resistance R1$rm$ in a normal temperature environment, the adjustment signal V1$ad$ is expressed by equation (3) based on equation (1).

$$V1ref = 0$$

$$V1t = V1d$$

$$V1ad = V1t + I1av \times R1rm \quad (3)$$

Based on equation (1) and equation (3), the command signal V1ref is expressed by equation (4).

$$V1d = V1ref + V1t + I1av \times R1rm - I1 \times R1$$

$$V1ref = I1 \times R1 - I1av \times R1rm \quad (4)$$

When the ambient temperature rises, the resistance R1 also increases. Therefore, as shown in FIG. 4, when the ambient temperature rises, the voltage of the command signal V1ref also increases.

Thus, in the endoscope apparatus 1, when the resistance R1 varies in accordance with the ambient temperature, the command signal V1ref also varies, and the distal end portion voltage V1$d$ is adjusted so as to become the target voltage V1$t$.

Next, operation of the circuit that supplies second system power will be described.

The command signal V1ref is inputted to the calculation section C21 from the calculation section C11. The calculation section C21 makes a calculation of the predetermined function f1 on V1ref and outputs the command signal V2ref to the power supply circuit P21. The command signal V2ref to which the adjustment signal V2$ad$ is added by the voltage adjustment section P21$a$ is inputted to the power supply circuit P21. In response to the command signal V2ref, the power supply circuit P21 generates the drive voltage V2 and the drive current I2 and outputs them to the power supply line L2.

In the power supply line L2, a voltage drop expressed by resistance R2×drive current I2 occurs. Therefore, based on equation (1), the distal end portion voltage V2$d$ is expressed by equation (5).

$$V2d = f1(V1ref) + V2ad - I2 \times R2 \quad (5)$$

On the other hand, when a characteristic of the predetermined function f1 in which f1(V1ref)=0 in a normal temperature environment is considered as a premise, if the adjustment signal V2$ad$ is adjusted in that condition, such that the distal end portion voltage $V2d$ matches the target voltage $V2t$, equation (6) holds.

$$V2ad=V2t+I2av \times R2rm \qquad (6)$$

Here, a resistance $R2rm$ represents a resistance value of the power supply line L2 in a normal temperature environment and an average current $I2av$ represents an average current value that flows through the power supply line L2. As shown in equation (6), on the premise that the adjustment signal $V2ad$ is adjusted, it is assumed that a relationship $V2d=V2t$ is kept as a result of performing control so that the control characteristic becomes a predetermined function f1. That is, if equation (6) is substituted into equation (5) to solve f1 (V1ref) assuming $V2d=V2t$, equation (7) holds.

$$f1(V1ref)=I2 \times R2-I2av \times R2rm \qquad (7)$$

Note that since V2ref has the same value as f1 (V1ref), f1 (V1ref) may be expressed as V2ref.

Since the power supply lines L1 and L2 are located at the same ambient temperature, the power supply lines L1 and L2 are defined by resistance R2=m×resistance R1, drive current I2=n×drive current I1 (m and n are constants of proportionality). Equation (8) is derived from this relationship and relationships of equation (4) and equation (7).

$$V2ref=f1(V1ref)=m \times n \times V1ref \qquad (8)$$

As shown in FIG. 5 and equation (8), the command signal V2ref varies depending on the command signal V1ref.

Thus, in the endoscope apparatus 1, when the resistance R1 and the command signal V1ref vary depending on the ambient temperature, the command signal V2ref also varies and the distal end portion voltage $V2d$ is adjusted so as to become the target voltage $V2t$.

Furthermore, in the endoscope apparatus 1, even when the load of the load apparatus D varies according to the ambient temperature, the distal end portion voltage $V2d$ is adjusted so as to become the target voltage $V2t$.

Since the operation of the circuit that supplies power in three systems is the same as the operation of the circuit that supplies second system power, description will be omitted. Note that as shown in FIG. 8, the command signal V3ref is shown by V3ref=f2(V1ref), and varies in accordance with the command signal V1ref.

According to the above-described embodiment, the endoscope apparatus 1 can supply the third system power to the distal end portion 4 of the insertion portion 3 more stably and since the distal end portion 4 is provided with no power supply circuit, it is possible to form the distal end portion 4 with a smaller diameter.

Modification 1 of Embodiment

According to the embodiment, the drive voltages V1, V2 and V3 are supplied according to a variation in the ambient temperature, but the apparatus may be configured such that the drive voltages V1, V2 and V3 are supplied in accordance with a variation in the operating mode of the load apparatus D.

Figure 6:
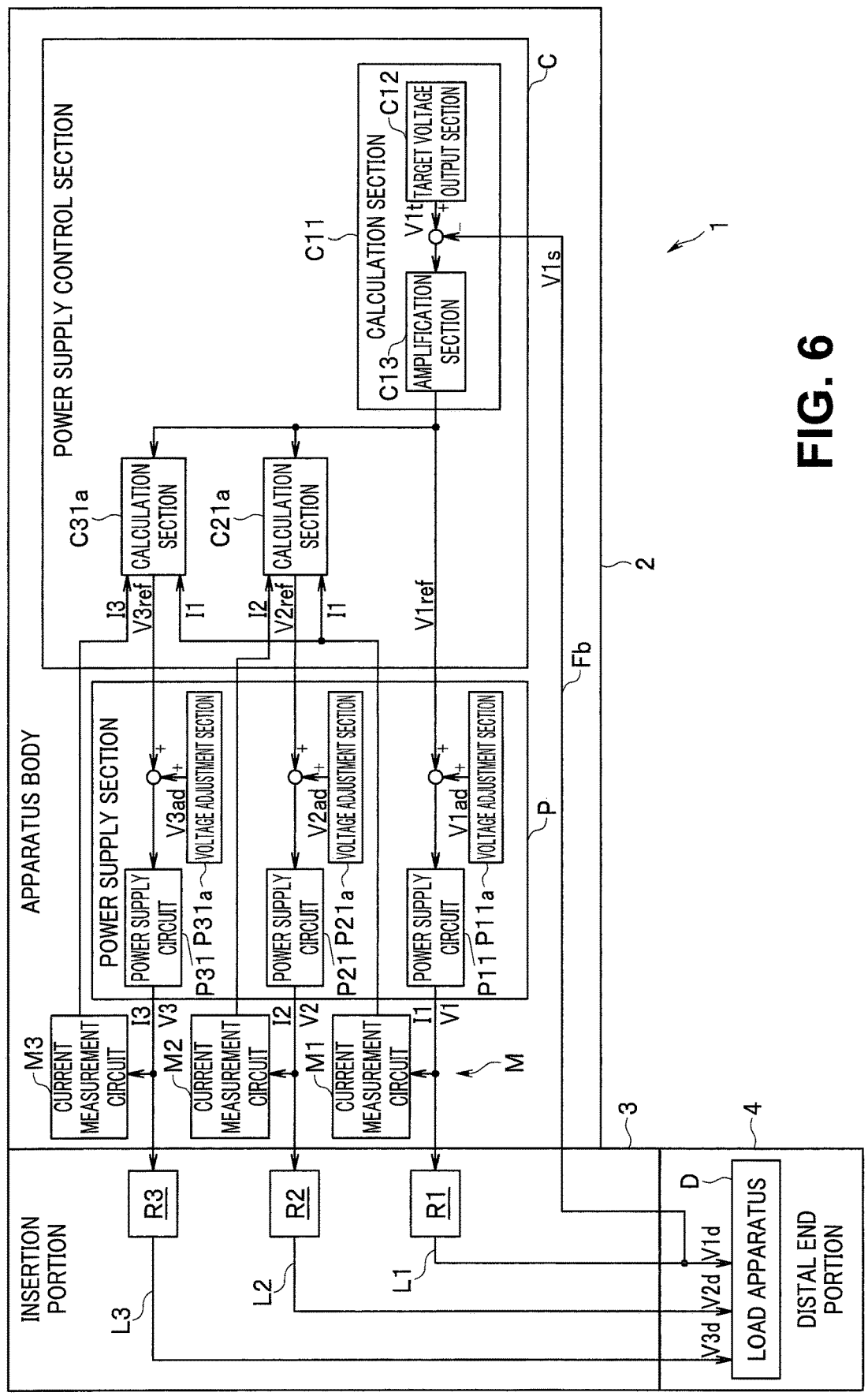
FIG. 6 is a block diagram illustrating an example of a configuration of the endoscope apparatus according to modification 1 of the embodiment of the present invention.
Figure 7:
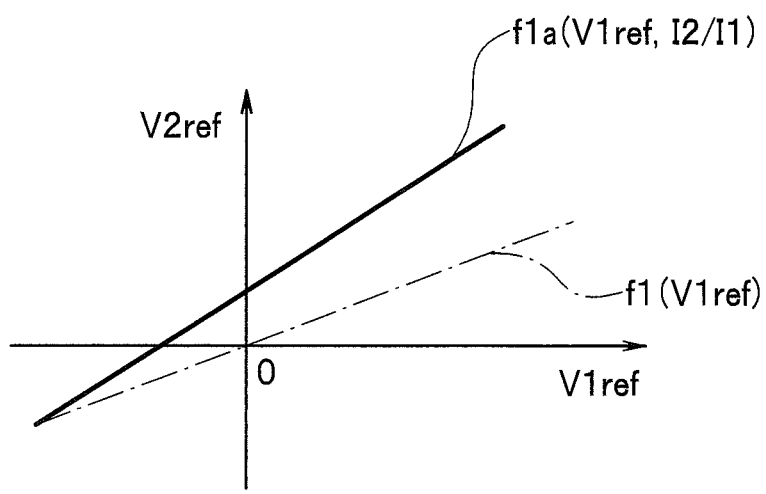
FIG. 7 is a graph for describing a command signal V2ref according to modification 1 of the embodiment of the present invention.

FIG. 6 is a block diagram illustrating an example of a configuration of the endoscope apparatus 1 according to modification 1 of the embodiment of the present invention. FIG. 7 is a graph for describing the command signal V2ref according to modification 1 of the embodiment of the present invention. In present modification 1, the same components as those in the embodiment are assigned the same reference numerals and description is omitted.

As shown in FIG. 6, the apparatus body 2 includes a current measurement section M configured to measure drive currents I1, I2 and I3 that flow through the power supply lines L1, L2 and L3. The current measurement section M includes current measurement circuits M1, M2 and M3.

A calculation section C21a is configured to make a calculation of a predetermined function f1a based on the inputted command signal V1ref and drive currents I1 and I2 and output the command signal V2ref to the power supply circuit P21. In modification 1, the predetermined function f1a is defined as a function of the command signal V1ref and the drive currents I1 and I2.

A calculation section C31a is configured to make a calculation of a predetermined function f2a based on the inputted command signal V2ref and drive currents I1 and I3 and output the command signal V3ref to the power supply circuit P31. In modification 1, the predetermined function f2a is defined as a function of the command signal V1ref and the drive currents I1 and I3.

The current measurement circuit M1 is configured to measure the drive current I1 flowing through the power supply line L1 and output the measurement result to the calculation sections C21 and C31.

The current measurement circuit M2 is configured to measure the drive current I2 flowing through the power supply line L2 and output the measurement result to the calculation section C21.

The current measurement circuit M3 is configured to measure the drive current I3 flowing through the power supply line L3 and output the measurement result to the calculation section C31.

That is, the apparatus body 2 includes the first current measurement circuit M1 configured to measure the first drive current I1 of the first power supply and output the measurement result to the second calculation section C21, the second current measurement circuit M2 configured to measure the second drive current I2 of the second power supply and output the measurement result to the second calculation section C21, and the second calculation section C21 is configured to determine the second command signal V2ref based on the first command signal V1ref, the first drive current I1 and the second drive current I2.

Next, operation according to modification 1 of the embodiment will be described.

If variations in the resistances R1 and R2 caused by temperatures are expressed by a temperature variation coefficient k, the variations can be expressed as $R1=kR1rm$ and $R2=kR2rm$.

Note that the temperature variation coefficient k is defined by $k=\alpha(Tp-25)+1$ based on a temperature Tp and a predetermined temperature coefficient $\alpha$.

If equation (4) is transformed using the temperature variation coefficient k and is further solved for the temperature variation coefficient k, equation (4) is transformed into equation (9).

$$V1ref=I1 \times kR1rm-I1av \times R1rm$$

$$V1ref=R1rm \times (kI1-I1av)$$

$$k=(V1ref+R1rm \times I1av)/(R1rm \times I1) \qquad (9)$$

Equation (10) is derived based on equation (7) and equation (9).

$$V2ref=I2 \times kR2rm-I2av \times R2rm$$

$$V2ref=R2rm(kI2-I2av)$$

$$V2\text{ref}=(R2rm/R1rm)\times(I2/I1)\times V1\text{ref}+R2rm\times((I1av\times I2)/I1-I2av)$$

$$V2\text{ref}=(R2rm/R1rm)\times(I2/I1)\times V1\text{ref}+R2rm\times I2av((I2/I1)\times(I1av/I2av)-1) \quad (10)$$

The resistances R1*rm* and R2*rm* and the average currents I1*av* and I2*av* in a normal temperature environment are preset. The command signal V2ref is determined by the drive currents I1 and I2 measured by the current measurement circuits M1 and M2, and the command signal V1ref inputted from the calculation section C11.

For example, as shown in FIG. 7, compared to a gradient of V2ref=f1(V1ref) shown by a broken line, the gradient of V2ref=f1*a*(V1ref, I2/I1) shown by a solid line is larger.

In this way, in the endoscope apparatus 1, when the command signal V1ref and drive currents I1 and I2 vary depending on a variation in the operating mode of the load apparatus D, the command signal V2ref also varies, and the distal end portion voltage V2*d* is adjusted to become the target voltage V2*t*.

Since the operation of the circuit that supplies third system power is the same as the operation of the circuit that supplies second system power, description will be omitted.

According to modification 1 of above-described embodiment, the endoscope apparatus 1 can supply power in three systems to the distal end portion 4 of the insertion portion 3 more stably and form the distal end portion 4 of the insertion portion 3 with a smaller diameter.

Modification 2 of Embodiment

According to modification 1 of the embodiment, a variation in the operating mode of the load apparatus D is detected by the current measurement section M, but the control section 61 may output operating mode information to the power supply control section C (two-dot dashed line in FIG. 1). In the description of the present modification, description of the same components as those of the embodiment is omitted.

According to modification 2 of the embodiment, the predetermined functions f1 and f2 are defined as functions of the command signal V1ref and the operating mode information.

That is, the power supply control section C can detect operating mode information indicating the operating mode of the load apparatus D and is configured to determine a second command signal based on the operating mode information and the first command signal.

This allows the endoscope apparatus 1 to make the circuit simpler.

Note that in the embodiment, the load apparatus D is constructed of the image pickup apparatus 21, the transmitting section 31 and the thermistor T, but the load apparatus D is not limited to this. For example, the load apparatus D may also be constructed of an acceleration sensor As provided at the distal end portion 4 (two-dot dashed line in FIG. 1) or may be another apparatus provided at the distal end portion 4.

Note that in the embodiment, the signal line S2 is formed of an optical fiber, but the signal line S2 may also be formed of a metal that electrically transmits an image pickup signal.

Note that three power supply lines L1, L2 and L3 are provided in the embodiment, but two or four or more power supply lines can be provided.

Each "section" in the present specification refers to a conceptual one corresponding to each function of the embodiment, and does not necessarily correspond to a specific hardware or software routine in a one-to-one correspondence. Therefore, the embodiment has been described in the present specification assuming a virtual circuit block (section) having each function of the embodiment. A whole or part of each "section" in the embodiment may be implemented by software as well. Regarding operation in the present embodiment, the apparatus may be operated in different operation order, operated in a plurality of steps simultaneously or operated in order which differs from one operation to another unless contrary to the nature of the embodiment.

The present invention is not limited to the above-described embodiment but can be changed or modified in various ways without departing from the spirit and scope of the present invention.

What is claimed is:

1. An endoscope apparatus comprising:
   a power supply configured to supply first power and second power to a load apparatus provided at a distal end portion of an insertion portion from an apparatus body; and
   a controller configured to control the power supply by instructing the power supply to determine a first command signal based on a target voltage and a feedback voltage which is a voltage of the first power fed back from the distal end portion to the apparatus body so as to output the first power in accordance with the first command signal, and instructing the power supply to determine a second command signal based on the first command signal so as to output the second power in accordance with the second command signal;
   wherein the controller is configured to output the target voltage, amplify the target voltage and a subtraction result of the feedback voltage by a predetermined amplification factor and determine the first command signal.

2. The endoscope apparatus according to claim 1, further comprising:
   a first power supply line;
   a second power supply line; and
   a feedback line, wherein
   the first power supply line supplies the first power from the power supply to the load apparatus,
   the second power supply line supplies the second power from the power supply to the load apparatus, and
   the feedback line is connected to the first power supply line in the distal end portion and configured to cause the feedback voltage to be fed back.

3. The endoscope apparatus according to claim 2, wherein the first power supply line, the second power supply line and the feedback line are inserted into the insertion portion.

4. The endoscope apparatus according to claim 1, wherein the controller is configured to make a predetermined calculation of the first command signal and determine the second command signal.

5. The endoscope apparatus according to claim 1, wherein the controller is configured to add a first adjustment signal to the first command signal and add a second adjustment signal to the second command signal.

6. The endoscope apparatus according to claim 1, further comprising a grounding wire configured to output a grounding voltage in the distal end portion to the controller.

7. The endoscope apparatus according to claim 6, wherein the controller determines the first command signal based on the target voltage and a result of subtracting the grounding voltage from the feedback voltage.

8. The endoscope apparatus according to claim 1, wherein the load apparatus comprises an image pickup sensor.

9. The endoscope apparatus according to claim 8, wherein the image pickup sensor is a CMOS image sensor.

10. The endoscope apparatus according to claim 6, wherein the load apparatus comprises a thermistor.

11. The endoscope apparatus according to claim 1, wherein the load apparatus comprises an acceleration sensor.

12. The endoscope apparatus according to claim 10, wherein
the grounding wire is connected to the thermistor, and
the thermistor is configured to output a thermistor signal to the controller.

13. The endoscope apparatus according to claim 1, wherein
the controller is further configured to make a predetermined calculation of the first command signal and determine the second command signal,
the apparatus body comprises:
a first current measurement circuit configured to measure a first drive current of the first power supply and output a measurement result to the controller; and
a second current measurement circuit configured to measure a second drive current of the second power supply and output a measurement result to the controller, and
the controller determines the second command signal based on the first command signal, the first drive current and the second drive current.

14. The endoscope apparatus according to claim 1, wherein the controller is configured to detect operating mode information indicating an operating mode of the load apparatus and determine the second command signal based on the operating mode information and the first command signal.

15. An endoscope apparatus comprising:
a power supply configured to supply first power and second power to a load apparatus provided at a distal end portion of an insertion portion from an apparatus body; and
a controller configured to control the power supply by instructing the power supply to determine a first command signal based on a target voltage and a feedback voltage which is a voltage of the first power fed back from the distal end portion to the apparatus body so as to output the first power in accordance with the first command signal, instructing the power supply to determine a second command signal based on the first command signal so as to output the second power in accordance with the second command signal, and making a predetermined calculation of the first command signal and determining the second command signal,
wherein the apparatus body comprises:
a first current measurement circuit configured to measure a first drive current of the first power supply and output a measurement result to the controller; and
a second current measurement circuit configured to measure a second drive current of the second power supply and output a measurement result to the controller, and
the controller determines the second command signal based on the first command signal, the first drive current and the second drive current.

16. The endoscope apparatus according to claim 15, further comprising:
a first power supply line;
a second power supply line; and
a feedback line, wherein
the first power supply line supplies the first power from the power supply to the load apparatus,
the second power supply line supplies the second power from the power supply to the load apparatus, and
the feedback line is connected to the first power supply line in the distal end portion and configured to cause the feedback voltage to be fed back.

17. The endoscope apparatus according to claim 15, wherein the controller is configured to add a first adjustment signal to the first command signal and add a second adjustment signal to the second command signal.

18. The endoscope apparatus according to claim 15, further comprising a grounding wire configured to output a grounding voltage in the distal end portion to the controller.

19. The endoscope apparatus according to claim 15, wherein the controller is configured to detect operating mode information indicating an operating mode of the load apparatus and determine the second command signal based on the operating mode information and the first command signal.

* * * * *